United States Patent
Kikuchi et al.

(10) Patent No.: US 6,222,329 B1
(45) Date of Patent: Apr. 24, 2001

(54) HORIZONTAL DEFLECTION CIRCUIT

(75) Inventors: Ken Kikuchi, Tokyo; Junzo Watanabe; Hidetaka Honji, both of Kanagawa; Susumu Otaki, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/463,170
(22) PCT Filed: May 25, 1999
(86) PCT No.: PCT/JP99/02744
§ 371 Date: Apr. 19, 2000
§ 102(e) Date: Apr. 19, 2000
(87) PCT Pub. No.: WO99/62247
PCT Pub. Date: Dec. 2, 1999

(30) Foreign Application Priority Data

May 25, 1998 (JP) .................................................. 10-143404

(51) Int. Cl.$^7$ ...................................................... H01J 29/56
(52) U.S. Cl. ............................. 315/399; 315/364; 315/370
(58) Field of Search ......................... 315/368.25, 368.28, 315/364, 370, 388, 399, 400, 387

(56) References Cited

U.S. PATENT DOCUMENTS

| 5,341,072 | * | 8/1994 | Watanabe et al. | 315/408 |
| 5,466,993 | * | 11/1995 | Leaver | 315/387 |
| 5,754,015 | * | 5/1998 | Nagaoka et al. | 315/399 |

* cited by examiner

Primary Examiner—Don Wong
Assistant Examiner—Wilson Lee
(74) Attorney, Agent, or Firm—Jay H. Maioli

(57) ABSTRACT

This invention is directed to a circuit for permitting stable operation of horizontal deflection output, and comprises: a first parallel circuit P1 composed of a first switching element 11, a first damper diode 12 and a first resonance capacitor 13; a second parallel circuit P2 composed of a second switching element 21, a second damper diode 22 and a second resonance capacitor 23; a horizontal deflection yoke 2 connected to the second parallel circuit P2; a flyback transformer 1; an integration circuit 16 operative to synthesize pulses from the first and second parallel circuits P1, P2 to generate deflection current and to integrate inputted horizontal deflection drive signal; first and second comparison•latch circuits 17, 27 for respectively comparing signal from the integration circuit 16 with first and second levels to latch comparison results; first and second drive circuits 19, 29 for respectively driving the first and second switching elements 11, 21; and a control element for controlling the second level.

5 Claims, 8 Drawing Sheets

HORIZONTAL DEFLECTION CIRCUIT

TECHNICAL FIELD

This invention relates to a horizontal deflection circuit used for television image receiver or display unit, etc. using cathode ray tube (CRT).

BACKGROUND ART

Horizontal deflection circuit used in television image receiver essentially serves to deliver sawtooth shaped current to horizontal deflection yoke. Generally, flyback transformer is connected as load equivalently in parallel with the horizontal deflection yoke. In addition, it is known that, in order to correct distortion of picture image known as pin cushion distortion, there is provided, as shown in FIG. 1, at the horizontal deflection circuit, a diode modulation circuit comprising a pin cushion distortion correction output transistor 151, a diode 152, a coil 153, a diode 154, a capacitor 155 and a pulse modulation transformer 156, etc.

The fundamental operation of horizontal deflection will be described below by taking the example of horizontal deflection circuit using transistor as switching element for horizontal output as shown in FIG. 1.

In FIG. 1, when, at the latter half of horizontal scanning time period, horizontal driver pulse of positive polarity is applied to base of a horizontal output transistor 131 so that the horizontal output transistor 131 is turned ON, collector current flows while linearly increasing through a primary coil 136a of a flyback transformer 136 from power source (supply terminal). Moreover, simultaneously therewith, positive deflection current flows in a horizontal deflection yoke 134 from sigmoid (S-shaped) distortion characteristic correction capacitors (hereinafter referred to as sigmoid correction capacitor as occasion may demand) 135a, 135b serving as power source (supply). Further, when the horizontal output transistor 131 is turned OFF at horizontal flyback (retrace) time period, collector current becomes equal to zero (0). In this case, while synthetic inductance of primary coil 136a of the flyback transformer 136 and the horizontal deflection yoke 134 and a resonance capacitor 133 resonate, charge current flows into resonance capacitor 133 from the horizontal deflection yoke 134 and the flyback transformer 136, and then discharge current for discharging it flows into the horizontal deflection yoke 134 and the flyback transformer 116. However, since a damper diode 132 is connected to the horizontal deflection yoke 134 and the flyback transformer 136, this resonant phenomenon stops at this stage. As a result, backward current from the horizontal deflection yoke 134 and the flyback transformer 136 does not flow in (through) the resonance capacitor 133, but flows in the damper diode 132. At this time, retrace pulse is generated in a secondary coil 136b of the flyback transformer 136. By rectifying this retrace pulse by rectifier circuit (not shown), high voltage can be obtained.

In addition, the pin cushion distortion correction output transistor 151 is caused to be turned ON at a predetermined timing corresponding to quantity of correction in synchronism with horizontal scanning to modulate current flowing in the horizontal deflection yoke 134 by waveform of a predetermined vertical period, thus making it possible to correct pin cushion distortion.

The above-described deflection operation is numerically indicated below. In this case, when maximum amplitude ((peak to peak) value which will be referred to as PP value hereinafter) of horizontal deflection current I flowing in the horizontal deflection yoke 134 is Ipp, maximum voltage of voltages V across both ends of the horizontal deflection yoke 134 is Vp, inductance of the horizontal deflection yoke 134 is L and horizontal flyback (hereinafter referred to as retrace) time period is Tre, voltage V is expressed as below.

$$V=L(dI/dt) \quad (1)$$

In the case where the retrace pulse can be approximated by sine wave curve, the maximum voltage Vp is expressed as below.

$$Vp=(\pi/2)LIpp/Tre \quad (2)$$

On the other hand, when CRT and horizontal deflection yoke 134 which are used are determined, energy of deflection magnetic field necessary for scanning electron beams by that horizontal deflection yoke 134 is univocally determined by shape of CRT and/or high voltage condition, etc. Since magnetic energy that current I flowing in indactance L has is expressed as $(\frac{1}{2})LI^2$, $LIpp^2$ represents deflection efficiency of this horizontal deflection yoke 134. When this deflection efficiency is W, the following formula holds.

$$LIpp^2=W \quad (3)$$

From the formulas (2), (3), the following relational expression is given.

$$IppVp=(\pi/2)W/Tre \quad (4)$$

When W and Tre are constant in the above-mentioned formula (4), horizontal deflection current Ipp is inversely proportional to retrace pulse voltage Vp across the both ends of the horizontal deflection yoke 134.

Since Vp of the retrace time period is necessarily smaller than voltage across the both ends of the switching element in the horizontal deflection circuit conventionally used as shown in FIG. 1, Vp is restricted by the withstand voltage performance of the switching element. Accordingly, in the case where horizontal deflection frequency is twice grater than that of ordinary case, such as, for example, flicker free television image receiver, since Tre is caused to be ½. Therefore, if Vp is unchanged when viewed from withstand voltage performance of the switching element, Ipp becomes double. As a result, there increases power loss in respective elements of the circuit by the above-mentioned fact. By this countermeasure, there inevitably results increase in the cost of circuit including respective elements.

DISCLOSURE OF THE INVENTION

This invention has been made in order to solve problems as described above and its object is to provide a horizontal deflection circuit in which retrace pulse voltage applied to the horizontal deflection yoke is caused to be large and deflection current is caused to be small, thus making it possible to easily carry out picture size adjustment in horizontal direction and distortion correction.

In order to solve the above-described problems, a horizontal deflection circuit according to this invention comprises: a first parallel circuit in which a first switching element, a first damper diode and a first resonance capacitor are connected in parallel, one end of the first parallel circuit being grounded, the first parallel circuit being operative to generate a first pulse; a second parallel circuit in which a second switching element, a second damper diode and a second resonance capacitor are connected in parallel, one end of the second parallel circuit being connected to the other end of the first parallel circuit, the second parallel circuit being operative to generate a second pulse; a horizontal deflection yoke having one end connected to the other end of the second parallel circuit and the other end connected to one end of a sigmoid (S-shaped) distortion characteristic correction capacitor; and a flyback transformer having one end connected to a DC power source (supply) and operative to deliver operation current to the first and second switching elements thus to synthesize the first pulse from the first parallel circuit and the second pulse from the second parallel circuit to generate deflection current for driving the horizontal deflection yoke, the horizontal deflection circuit comprising: an integration circuit for integrating horizontal drive signal inputted thereto; a first comparison•latch circuit for comparing signal from the integration circuit with first level to latch comparison result; a second comparison•latch circuit for comparing signal from the integration circuit with second level to latch comparison result; a first drive circuit for driving the first switching element in accordance with an output of the first comparison•latch circuit; a second drive circuit for driving the second switching element in accordance with an output of the second comparison•latch circuit; and control means for controlling the second level.

Namely, the horizontal deflection circuit according to this invention generates, with respect to integral waveform obtained by integrating horizontal drive pulse, drive signals of the first and second switching elements by the first comparison•latch circuit for carrying out comparison•latch with respect to the integral waveform and first reference potential and the second comparison•latch circuit for carrying out comparison•latch with respect to the integral waveform and second reference potential. In this case, such an approach is employed to control the second reference potential to thereby relatively adjust timing of drive signal for driving the second switching element with respect to drive signal for driving the first switching element.

In addition, such a configuration is employed to generate, by the same circuit configuration, from the original same waveform, different two drive waveforms for driving the first and second switching elements to form a pulse for determining OFF timings of the first and second switching elements at timing backward in point of time from the original horizontal drive waveform.

BEST MODE FOR CARRYING OUT THE INVENTION

Preferred embodiments of a horizontal deflection circuit according to this invention will be described in detail below with reference to the attached drawings.

Figure 1:
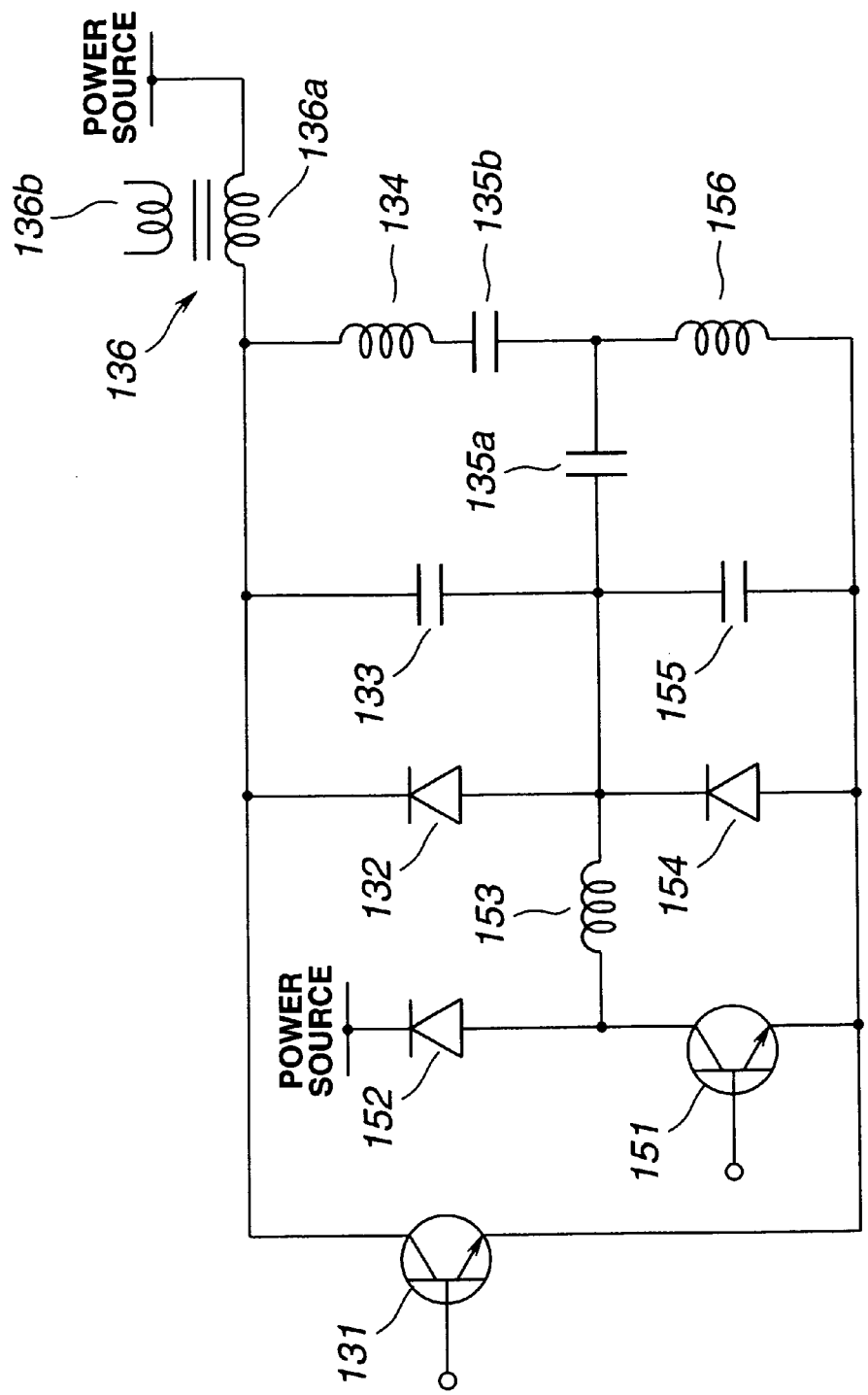
FIG. 1 is a view for explaining a conventional horizontal deflection circuit.
Figure 2:
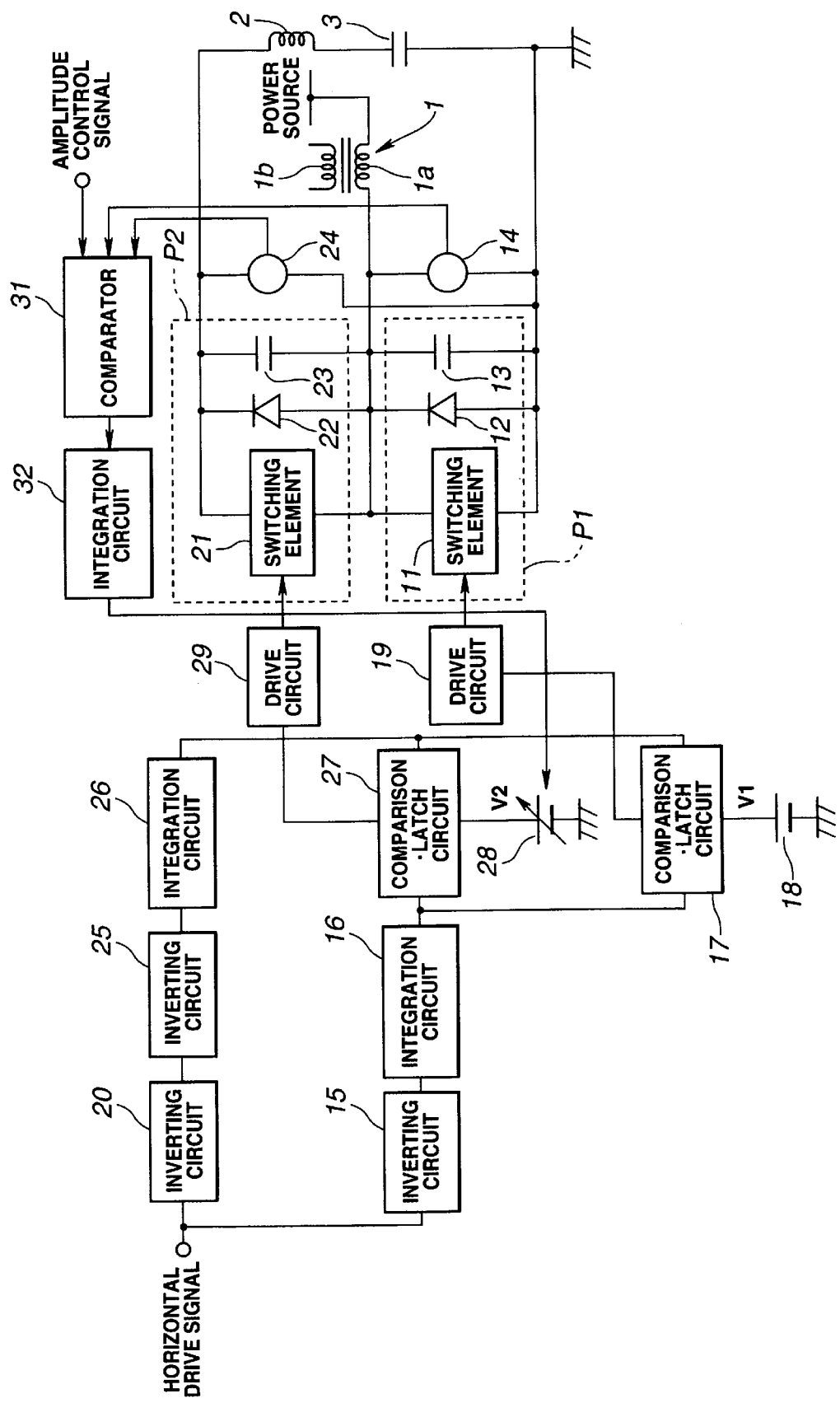
FIG. 2 is a block diagram showing outline of the configuration of horizontal deflection circuit.

The embodiment of the horizontal deflection circuit according to this invention is constituted as shown in FIG. 2.

In this case, for convenience of explanation of the horizontal deflection circuit according to this invention, explanation will be given with reference to FIG. 3 in connection with the horizontal deflection circuit already disclosed by this applicant in the Japanese Patent Application No. 221366/1997 (U.S. patent application Ser. No. 133992, filed on Aug. 4, 1998) specification. This horizontal deflection circuit shown in FIG. 3 is common in the main portions to the horizontal deflection circuit according to this invention.

Figure 3:
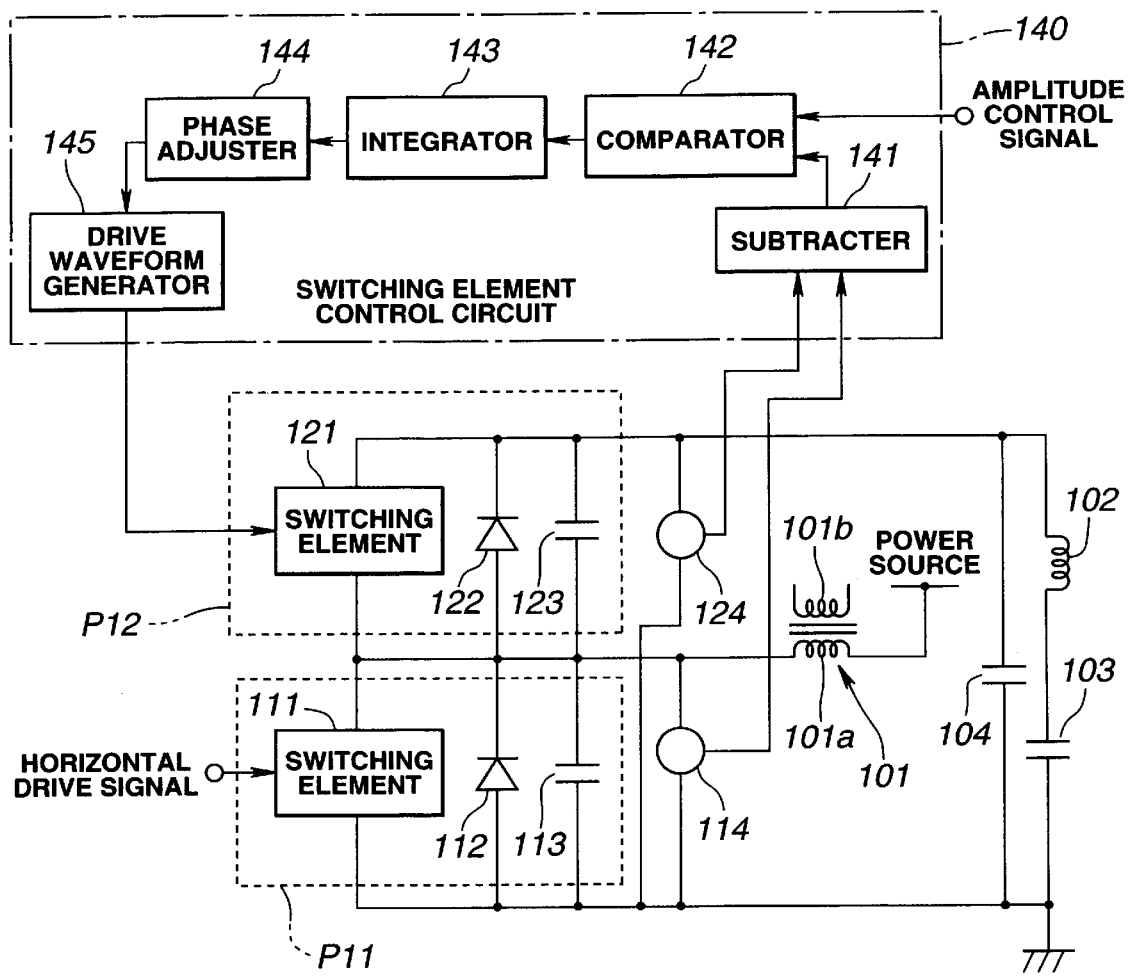
FIG. 3 is a block diagram of horizontal deflection circuit disclosed in the Japanese Patent Application No. 221366/1997 specification.

The horizontal deflection circuit of FIG. 3 includes: a first parallel circuit P11 having one end grounded, and in which a first switching element 111, a first damper diode 112 and a first resonance capacitor 113 are connected in parallel; and a second parallel circuit P12 having one end connected to the other end of the first parallel circuit P11, and in which a second switching element 121, a second damper diode 122 and a second resonance capacitor 123 are connected in parallel. The first switching element 111 is switching element for horizontal output and the second switching element 121 is switching element for pin cushion distortion correction.

Moreover, the horizontal deflection circuit of FIG. 3 includes a flyback transformer 101 in which a primary coil 101a is connected between junction of the other end of the first parallel circuit P11 and one end of the second parallel circuit P12 and power supply line (power source), a resonance capacitor 104 having one end connected to the other end of the second parallel circuit P12 and the other end grounded, a horizontal deflection yoke 102 having one end connected to the other end of the second parallel circuit P12, and a sigmoid (S-shaped) distortion characteristic correction capacitor 103 having one end connected to the other end of this horizontal deflection yoke 102 and the other end grounded.

Further, the horizontal deflection circuit of FIG. 3 includes a first pulse reading circuit 114 for detecting first pulse from the first parallel circuit P11, a second pulse reading circuit 124 for reading second pulse from the second parallel circuit P12, and a switching element control circuit 140 for carrying out drive control of the second switching element 121 on the basis of pulses respectively detected at the first pulse reading circuit 114 and the second pulse reading circuit 124.

The above-mentioned switching element control circuit 140 comprises a subtracter 141 for carrying out subtractive operation between signals from the first and second pulse reading circuits 114 and 124, a comparator 142 for carrying out comparison operation between data which has been caused to undergo subtractive operation at the subtracter 141 and amplitude control voltage delivered from the external, an integrator 143 for integrating data from the comparator 142, a phase adjuster 144 for carrying out adjustment of phase of output from the integrator 143, and a drive waveform generator 145 for generating drive waveform on the basis of data from the phase adjuster 144.

Synthetic (Synthesized) pulse of the first pulse from the first parallel circuit P11 and the second pulse from the second parallel circuit P12 is applied to the horizontal deflection yoke 102. By this synthetic pulse, deflection current flows in the horizontal deflection yoke 102.

More particularly, horizontal drive signal is inputted to the first switching element 111 of horizontal output. As a result, the first switching element 111 of horizontal output is turned ON. Simultaneously therewith, the second switching element 121 is also turned ON by drive signal from the switching element control circuit 140. As a result, these first and second switching elements 111 and 121 are both caused to be in conductive state. Thus, deflection current flows in the horizontal deflection yoke 102.

On the other hand, at the time of OFF, the first switching element 111 is turned OFF in a manner earlier than the second switching element 121. Thus, retrace time period which is horizontal retrace time period begins. Within this retrace time period, the second switching element 121 is caused to undergo ON/OFF control by the switching element control circuit 140.

Such a series of operations will be described with reference to waveforms shown in FIGS. 4A to 4D.

Figure 4:
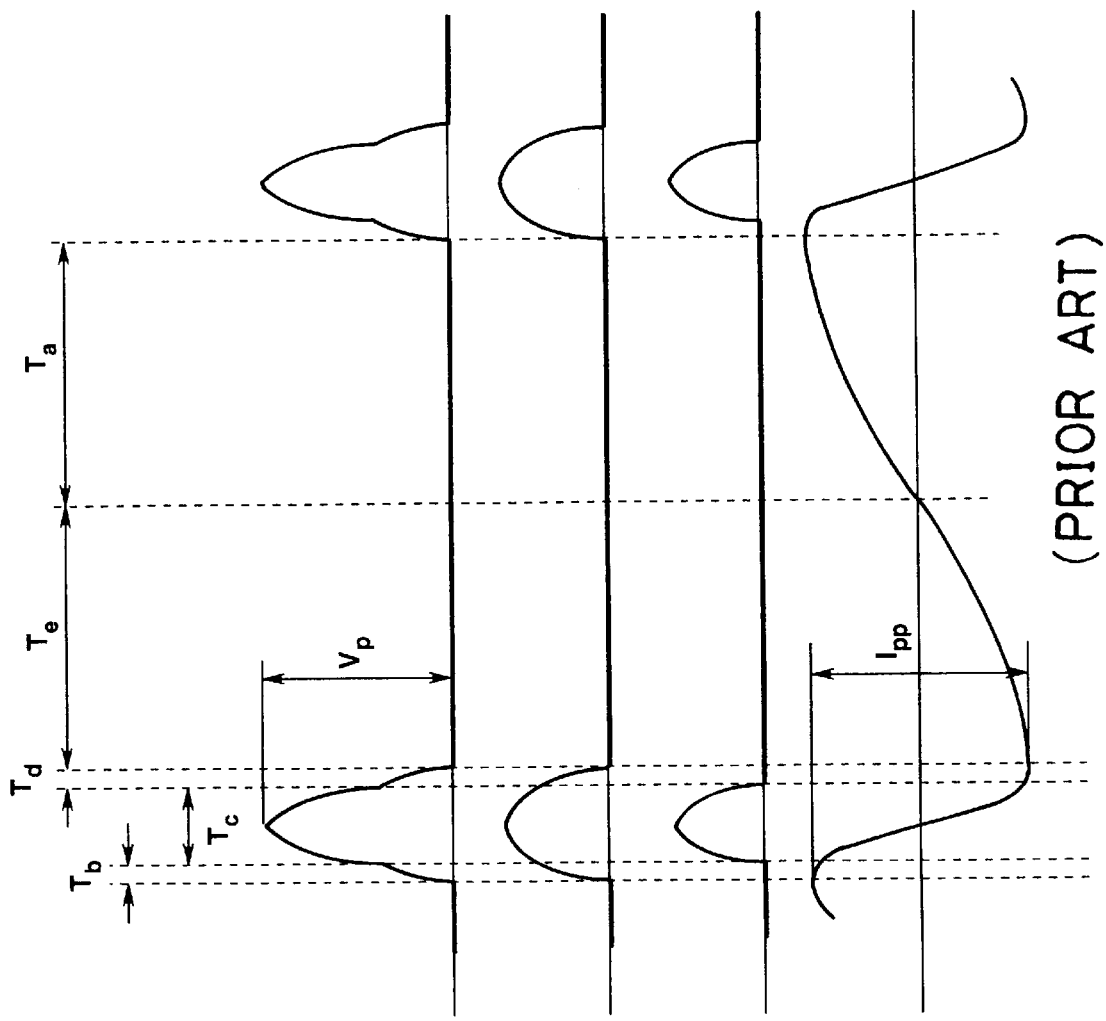
FIGS. 4A to 4D are views showing waveforms of respective portions of the horizontal deflection circuit shown in FIG. 3.

In this case, FIG. 4A shows voltage waveform (with respect to ground) of the switching element 121 of FIG. 3, FIG. 4B shows voltage waveform (with respect to ground) of the switching element 111, FIG. 4C shows long and short voltage waveform of the switching element 121 and FIG. 4D shows current waveform of the horizontal deflection yoke 102.

In these FIGS. 4A to 4D, the trace time period Ta is the time period in the state where both the first and second switching elements 111 and 121 of FIG. 3 are conductive. At this time, deflection current flowing in the horizontal deflection yoke 102 and flyback transformer current flowing in the flyback transformer 101 increase at gradient corresponding to voltage across the both ends of the sigmoid (S-shaped) correction capacitor 103 and power supply voltage. Waveform of the deflection current at this time is shown in FIG. 4D.

In order that the operation enters the retrace time period, the first switching element 111 is initially turned OFF by horizontal drive signal. At this time, the second switching element 121 still remains in the conductive state. At this time, currents which have flowed in the flyback transformer 101 and/or horizontal deflection yoke 102 flow into resonance capacitors 104, 113. As a result, voltages appear across both ends of the resonance capacitors 104, 113. Thus, current starts inverting (reversal) operation. Namely, resonant operation begins and voltage/current waveforms thereof are waveforms in time period Tb of FIGS. 4A to 4D.

Even if, at the latter half of the retrace time period, the second switching element 121 is caused to be turned OFF after deflection current reaches zero (0), because the second damper diode 122 exists, when the second switching element 121 is caused to be turned OFF for a time period during which deflection current reaches zero (0) until the first half of retrace, another resonance capacitor 123 is connected in series with the horizontal deflection yoke 102.

Further, since the deflection current flows also into the resonance capacitor 123, voltage appears also across the both ends of the resonance capacitor 123. Thus, as shown in FIG. 4A, it is possible to apply pulse voltage larger than pulse at both ends of the first switching element 111 to both ends of the horizontal deflection yoke 102.

In this example, since peak value of retrace pulse voltage across the both ends of the first switching element 111 is univocally determined by power supply voltage and ratio between retrace time and trace time and is therefore constant, voltage of this pulse is elevated by flyback transformer 101 as shown in FIG. 4B so that its voltage value is permitted to be high voltage used for CRT.

At the retrace time period, charges which have been flowed into resonance capacitors 104, 114, 124 all flow out. When voltage across the both ends becomes equal to zero (0), the first and second damper diodes 112 and 122 are automatically conductive. The operation is thus completed. In this case, the first and second damper diodes 112 and 122 are assumed to be ideal diode for simplicity.

In this example, since current flowing into the first resonance capacitor 113 is less than current flowing into the second resonance capacitor 123 at all times, charges of the second resonance capacitor 123 are lost fast, so the second damper diode 122 becomes conductive in a manner earlier than the first damper diode 112.

For this reason, as shown in the time periods Tb to Td of FIG. 4B and the time period Tc of FIG. 4C, pulse appearing across the both ends of the second switching element 121 has width narrower than that of pulse appearing across the both ends of the first switching element 111.

Moreover, since when OFF timing of the switching element 121 is retarded, current flowing into the resonance capacitor 123 is further reduced, pulse across the both ends of the second switching element 121 at this time has narrower pulse width and lower pulse height.

Namely, by controlling phase of OFF timing of the second switching element 121, retrace pulse voltage applied across the both ends of the horizontal deflection yoke 102 can be controlled. Resultantly, amplitude of deflection current can be adjusted or changed.

Further, when the second damper diode 122 has been conductive, retrace operation is continued similarly to ordinary deflection circuit until both terminal voltages of the resonance capacitors 104, 113 become equal to zero (0). Thus, the operation enters the trace time period Te simultaneously with termination of retrace.

At this trace time period Te, as shown in FIG. 4D, horizontal deflection current flows from the horizontal deflection yoke 102 in the forward direction of the first and second damper diodes 112 and 122. Further, during such a time period, the first and second switching elements 111 and 121 are caused to be placed in conductive state thus to stand by next trace time period Ta.

As stated above, horizontal deflection current repeatedly flows over time periods Ta, Tb, Tc, Td and Te. Thus, the horizontal deflection yoke 102 forms horizontal deflection magnetic field.

Detailed explanation will now be given in connection with a method of controlling OFF timing of the switching element to thereby adjust or change amplitude of horizontal deflection current to carry out correction of pin cushion distortion and/or horizontal picture size adjustment.

Maximum amplitude (PP value) Ipp of horizontal deflection current is proportional to integral value of retrace pulse voltage applied across both ends of the horizontal deflection yoke of retrace time period. Meanwhile, since this retrace pulse voltage is about 1200 to 2200 volts, that voltage is divided into low voltage which can be processed. Attempt is made to compare with each other this divided voltage and reference voltage indicating amplitude of horizontal deflection to integrate its difference thereafter to provide feedback with respect to drive signal of switching element so that the integral value becomes equal to zero (0) thus to control Ipp of horizontal deflection current with high accuracy. As an example of this embodiment, there is provided switching element control circuit 140 shown in FIG. 3.

In FIG. 3, first pulse generated at the first parallel circuit P11 is read at the first pulse reading circuit 114 and second pulse generated at the second parallel circuit P12 is read at the second pulse reading circuit 124.

In this example, outputs of these first and second reading circuits 114 and 124 are obtained by dividing retrace pulse voltage by using capacitor voltage division, etc.

Signals detected at these first and second pulse reading circuits 114 and 124 are inputted to the switching element control circuit 140.

Further, at the switching element control circuit 140, there is provided difference voltage obtained by subtracting divided voltage value of retrace pulse voltage of the second switching element 121 of the second parallel circuit P12 from divided voltage value of retrace pulse voltage of the first switching element 111 of the first parallel circuit P11 by using subtracter 141 such as operational amplifier, etc.

This difference voltage and amplitude control voltage corresponding to a predetermined horizontal amplitude are compared at the comparator 142. In this case, parabola-shaped voltage for correcting pin cushion distortion is ordinarily added to (superimposed on) this amplitude control voltage.

Further, the compared voltage is integrated by the integrator 143 so that there results DC voltage, and is inputted to the phase adjuster 144 as signal for adjusting phase of drive signal of the second switching element 121, in more practical sense, timing of OFF.

The timing pulse formed at the phase adjuster 144 is delivered to the drive waveform generator 145. Thus, a drive signal sufficient to drive the second switching element 121 is formed.

By feedback loop by such a switching element control circuit 140, the second switching element 121 outputs deflection current while controlling OFF timing.

While explanation has been given in connection with the case where the closed loop control system of OFF timing is placed in the state of stable operation, since different operation may be carried out in dependency upon circuit configuration at the transient time such as initial operation at the time of power ON. Accordingly, attention is paid to this matter.

Namely, in the switching element control system constituted so as to include the above-mentioned switching element control circuit 140, area when divided voltage value of voltage waveform of retrace pulse of the second switching element 121 is subtracted from divided voltage value of voltage waveform of retrace pulse of the first switching element 111 linearly changes with respect to amplitude of deflection current.

Further, when power is turned ON, feedback loop is operative so that retrace pulse does not take place across the both ends of the second switching element 21 until that subtractive area reaches a predetermined value.

In other words, since retrace pulse does not take place at both ends of the second switching element 21 until retrace pulse across both ends of the first switching element 11 reaches a predetermined waveform height value, stable power ON is provided.

However, in accordance with the horizontal deflection circuit shown in FIG. 3, there was left the problem in connection with stability in the case where OFF timing of the second switching element is generally later than OFF timing of the first switching element, but OFF timing of the second switching element is earlier than timing of the first switching element.

This invention contemplates providing such a horizontal deflection circuit stably operative even in the case where OFF timing of the second switching element is earlier than OFF timing of the first switching element by utilizing the essential part of the circuit for producing horizontal deflection current in the horizontal deflection circuit shown in FIG. 3.

The embodiment of the horizontal deflection circuit according to this invention will now be described.

The horizontal deflection circuit of the embodiment of this invention includes, as shown in FIG. 2, a first parallel circuit P1 having one end grounded and in which a first switching element 11, a first damper diode 12 and a first resonance capacitor 13 are connected in parallel, and a second parallel circuit P2 having one end connected to the other end of the first parallel circuit P1 and in which a second switching element 21, a second damper diode 22 and a second resonance capacitor 23 are connected in parallel. The first switching element 11 is switching element for horizontal output and the second switching element 12 is switching element for pin cushion distortion correction.

Moreover, the horizontal deflection circuit includes a flyback transformer 1 in which primary coil is connected between junction of the other end of the first parallel circuit P1 and one end of the second parallel circuit P2 and power supply line, a horizontal deflection yoke 2 having one end connected to the other end of the second parallel circuit P2, and a sigmoid (S-shaped) distortion characteristic correction capacitor 3 having one end connected to the other end of the horizontal deflection yoke 2, and the other end grounded.

Further, the horizontal deflection circuit includes a first pulse reading circuit 14 for detecting first pulse from the first parallel circuit P1, and a second pulse reading circuit 24 for reading second pulse from the second parallel circuit P2.

Further, the horizontal deflection circuit includes a comparator 31 for processing, in accordance with amplitude control signal from the external, result obtained by comparison between first pulse detected at the first pulse reading circuit 14 and second pulse detected at the second pulse reading circuit 24, and an integration circuit 32 for integrating signal from the comparator 31.

Further, the horizontal deflection circuit includes a first inverting circuit 15 for inverting horizontal drive signal, a second inverting circuit 20 for inverting the horizontal drive signal, a third inverting circuit 25 for further inverting signal from the second inverting circuit 20, a first integration circuit 16 for integrating signal from the first inverting circuit 15, and a second integration circuit 26 for integrating signal from the third inverting circuit 25.

Further, the horizontal deflection circuit includes a first comparison•latch circuit 17 for carrying out comparison•latch of signals from the first and second integration circuits 16 and 26 with reference potential V1 from a reference potential source 18 being as reference, and a first drive circuit 19 for driving the first switching element 11 in accordance with output from the first comparison•latch circuit 17.

In addition, the horizontal deflection circuit includes a second comparison•latch circuit 27 for carrying out comparison•latch of signals from the first integration circuit 16 and the second integration circuit 26 with reference potential V2 from a reference potential source 28 being as reference, and a second drive circuit 29 for driving the second switching element 21 in accordance with output from the second comparison•latch circuit 27.

More practical configuration of the horizontal deflection circuit of which outline of configuration is shown in FIG. 2 will now be described with reference to the circuit diagram shown in FIG. 5.

In this horizontal deflection circuit, as both the first switching element 11 and the second switching element 21, transistors are respectively used.

In the first inverting circuit 15, the second inverting circuit 20 and the third inverting circuit 25, respective inverted outputs are taken out by collector resistor of emitter grounded transistor.

In the first integration circuit 16 and the second integration circuit 26, inverted outputs from the first inverting circuit 15 and the third inverting circuit 25 are respectively integrated by capacitors. The integrated outputs thus obtained are provided as outputs.

In the first comparison•latch circuit 17 and the second comparison•latch circuit 27, outputs from the first integration circuit 16 and the second integration circuit 26 are respectively compared with first reference potential V1 and second reference potential V2 at comparators, and outputs from the comparators are respectively latched at latch circuits composed of transistors.

The first reference potential V1 from the first reference potential source 18 shown in FIG. 2 is obtained by voltage division based on resistor voltage division from DC power supply voltage of 9 volts in this example. Moreover, second reference potential V2 from the second potential source 28 is potential in which signal voltage from the integration circuit 32 is superimposed on potential obtained by resistor voltage division from DC power supply of 9 volts.

The first drive circuit 19 and the second drive circuit 29 deliver, to the first switching element 11 and the second switching element 21, through transformers, outputs obtained by respectively amplifying outputs from the first comparison•latch circuit 17 and the second comparison•latch circuit 27 by 2-stages of transistors to drive these first and second switching elements 11, 21.

The operation of the horizontal deflection circuit will now be described.

Figure 6A:
FIGS. 6A to 6L are views showing waveforms of respective portions of the horizontal deflection circuit shown in FIG. 5.
Figure 6B:
Figure 6C:

A horizontal drive (HD) signal as shown in FIG. 6A is inputted from the external to the first inverting circuit 15 of the horizontal deflection circuit. This horizontal drive signal is inverted by the first inverting circuit 15 and is integrated by the first integration circuit 16. Thus, waveform as shown in FIG. 6C is provided.

Figure 6D:

On the other hand, the horizontal signal shown in FIG. 6A is inputted from the external also to the second inverting circuit 20 of the horizontal deflection circuit. This horizontal drive signal is inverted by the second inverting circuit 20 as shown in FIG. 6B. The horizontal drive signal inverted by this second inverting circuit 20 is further inverted at the third inverting circuit 25, and is integrated at the second integration circuit 26. Thus, waveform as shown in FIG. 6D is provided.

Output from the first integration circuit 16 is inputted to the inverting input (terminal) of a comparator 17a of the first comparison•latch circuit 17 and is also inputted to inverting input (terminal) of a comparator 27a of the second comparison•latch circuit 27.

Reference potential V1 from the first reference potential generating source 18 is inputted to the non-inverting input (terminal) of the comparator 17a of the first comparison•latch circuit 17. Similarly, reference potential V2 from the second reference potential source 28 is inputted to the non-inverting input (terminal) of the comparator 27a of the second comparison•latch circuit 27.

In this case, waveforms for correcting horizontal picture size, pin distortion and other picture distortion from the integration circuit 32 are superimposed on the reference potential V2.

Figure 6E:
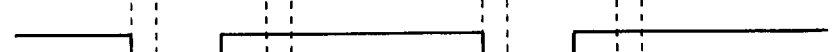
Figure 6F:
Figure 6G:

At the comparator 17a of the first comparison•latch circuit 17, as the result of the fact that output from the first integration circuit 16 inputted to the inverting input (terminal) and reference potential V1 inputted to the non-inverting input (terminal) are compared with each other, waveform as shown in FIG. 6G is outputted.

Figure 6H:
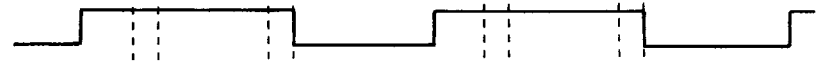

At the comparator 27a of the second comparison•latch circuit 27, as the result of the fact that output from the first integration circuit 16 inputted to the inverting input (terminal) and reference potential V2 inputted to the non-inverting input (terminal) are compared with each other, waveforms as shown in FIG. 6H is outputted.

Output from the second integration circuit 26 is inputted to the inverting input (terminal) of the comparator 17b of the first comparison•latch circuit 17, and is also inputted to the inverting input (terminal) of the comparator 27b of the second comparison•latch circuit 27.

At the comparator 17b of the first comparison•latch circuit 17, as the result of the fact that output from the second integration circuit 26 inputted to the inverting input (terminal) and reference potential V1 inputted to the non-inverting input (terminal) are compared with each other, waveform as shown in FIG. 6E is outputted.

At the comparator 27b of the second comparison•latch circuit 27, as the result of the fact that output from the second integration circuit 26 inputted to the inverting input (terminal) and reference potential V2 inputted to the non-inverting input (terminal), waveform as shown in FIG. 6F is outputted.

Figure 6I:
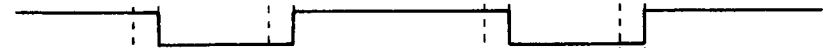
Figure 6J:

At the first comparison•latch circuit 17, waveform shown in FIG. 6G, which is outputted from the comparator 17a, and waveform shown in FIG. 6E, which is outputted from the comparator 17b, are latched at latch circuit including transistors 17c, 17d. Thus, waveform shown in FIG. 6J is outputted.

At the second comparison•latch circuit 27, waveform shown in FIG. 6H, which is outputted from the comparator 27a, and waveform shown in FIG. 6F, which is outputted from the comparator 27b, are latched at a latch circuit including transistors 27c, 27d. Thus, signal of waveform shown in FIG. 6I is outputted.

Outputs from the first comparison•latch circuit 17 and the second comparison•latch circuit 27 respectively serve as drive signals for the first switching element 11 and the second switching element 21. Namely, the first drive circuit 19 and the second drive circuit 29 respectively drive the first switching element 11 and the second switching element 21 in accordance with outputs from the first comparison•latch circuit 17 and the second comparison•latch circuit 27.

Figure 6K:
Figure 6L:

By drive operation of the first switching element 11 by the first drive circuit 19, a first pulse as shown in FIG. 6K is generated. In addition, by drive operation of the second switching element 21 by the second drive circuit 29, a second pulse as shown in FIG. 6L is generated. Thus, pulse in which the first and second pulses are synthesized is applied to the horizontal deflection yoke 2.

In this example, t1 and t2 in FIGS. 6K and 6l are respectively storage times of the first switching element 11 and the second switching element 21.

In this horizontal deflection circuit, at OFF timing of the second switching element 21, correction of horizontal picture size and pin cushion distortion is carried out.

In ordinary state, OFF timing of the second switching element 21 is later than OFF timing of the first switching element 11. However, there are also instances where this timing may be reversed (in point of time) in dependency upon circumstances by influence, such as, for example, storage time of transistor, etc.

Even in such a case, in accordance with this invention, by employment of the circuit configuration as described above, even in the case where timing is reversed, control of the second switching element 21 can be carried out.

Namely, in the case where drive operation of the first switching element 11 is directly carried out by using timing of horizontal drive and drive operation of the second switching element 21 is carried out at timing of horizontal drive pulse generated by integration and comparison, etc., if OFF timing of the second switching element 21 is not absolutely later than (backward in point of time with respect to) OFF timing of the first switching element 11, control cannot be carried out.

In view of the above, in the horizontal deflection circuit according to this invention, with respect to integral waveform obtained by integrating horizontal drive pulse which is horizontal deflection drive signal, drive signals for the first and second switching elements are respectively generated by the first comparison•latch circuit for carrying out comparison•latch with respect to the integral waveform and first reference potential and second comparison•latch circuit for carrying out comparison•latch with respect to the integral waveform and the second reference potential. Thus, the second reference potential is controlled to thereby relatively adjust timing of drive signal for driving the second switching element with respect to drive signal for driving the first switching element, thereby eliminating inconveniences taking place in the horizontal deflection circuit of FIG. 3.

Moreover, the circuit for delivering drive pulse to the first switching element 11 and the circuit for delivering drive pulse to the second switching element 21 are caused to be of the same configuration.

For this reason, even at the time of operation except for ordinary state like the time of power ON or the time of channel switching, or the time of occurrence of other inconvenience, the first comparisons latch circuit 17 and the second comparison•latch circuit 27 both carry out the same operation.

Accordingly, the operations of the first and second switching elements 11 and 21 extremely become stable.

In the horizontal deflection circuit of FIG. 3, original horizontal deflection drive pulse was directly used as pulse for driving the first switching element 111, and pulse for driving the second switching element 121 is formed differently from pulse for driving the first switching element 111.

As compared to the above, in the above-described horizontal deflection circuit, OFF timing of the second switching element 121 is generally later than (backward in point of time with respect to) OFF timing of the first switching element 111. However, also even in the case where OFF timing of the second switching element 121 is earlier than (forward in point of time with respect to) OFF timing of the first switching element 111, control can be carried out. In addition, configuration is employed such that also under operational condition except for steady state, drive pulses for the first switching element 111 and the second switching element 121 are caused to be changed in the same manner. By employing such a configuration, horizontal deflection circuit in which stability of the circuit operation has been increased is provided.

As described above, in accordance with this invention, the restriction that OFF timing of the second switching element must be later than (backward in point of time with respect to) OFF timing of the first switching element is eliminated. Even if OFF timing of any switching element is forward in point of time, control can be made.

Further, in accordance with this invention, since generation methods of drive pulses for the first switching element and the second switching element are the same, the both elements carry out the same operation also at the timing except for ordinary operation. Thus, the operation is stable.

As explained above, in this invention, such an approach is employed to prepare, with respect to the horizontal deflection circuit shown in FIG. 3, drive waveform with respect to the first switching element and drive waveform with respect to the second switching element by the same circuit configuration at a timing later than (backward in point of time with respect to) the original drive waveform. By employing such an approach, even if OFF timing of any switching element is backward in point of time, control can be carried out. In addition, stable operation can be carried out at the time except for ordinary operation.

Figure 5:
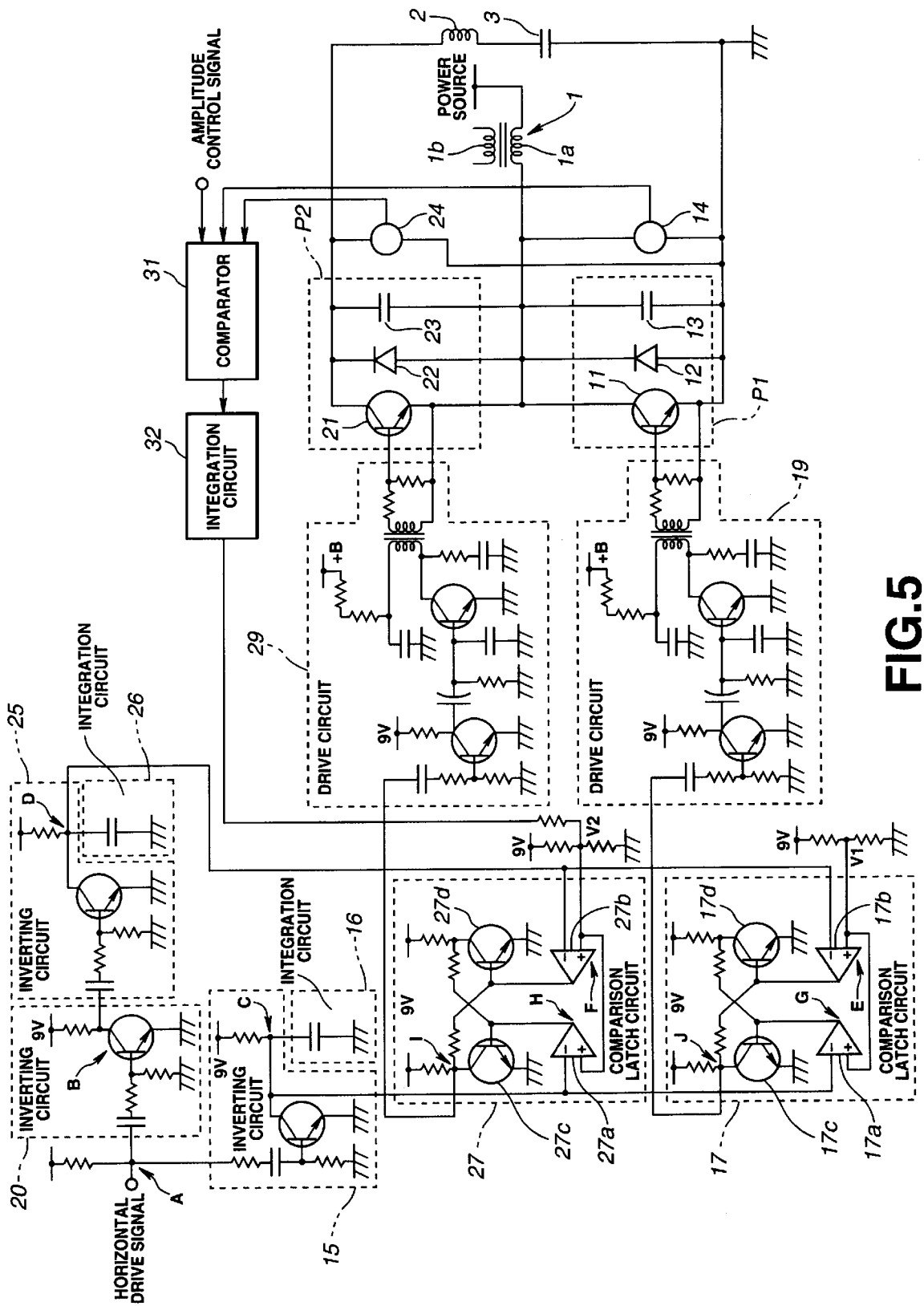
FIG. 5 is a view showing more practical configuration of horizontal deflection circuit.

It is to be noted that the circuit configuration of the above-described horizontal deflection circuit is not limited to the example shown in FIG. 5. The above-described example is merely one example. The circuit characterized in that the circuit configurations for generating drive pulses with respect to the first switching element and the second switching element are the same as described above is not limited to this configuration, but various configurations can be employed. In more practical sense, first modified example shown in FIG. 7 and second modified example shown in FIG. 8 may be employed.

Figure 7:
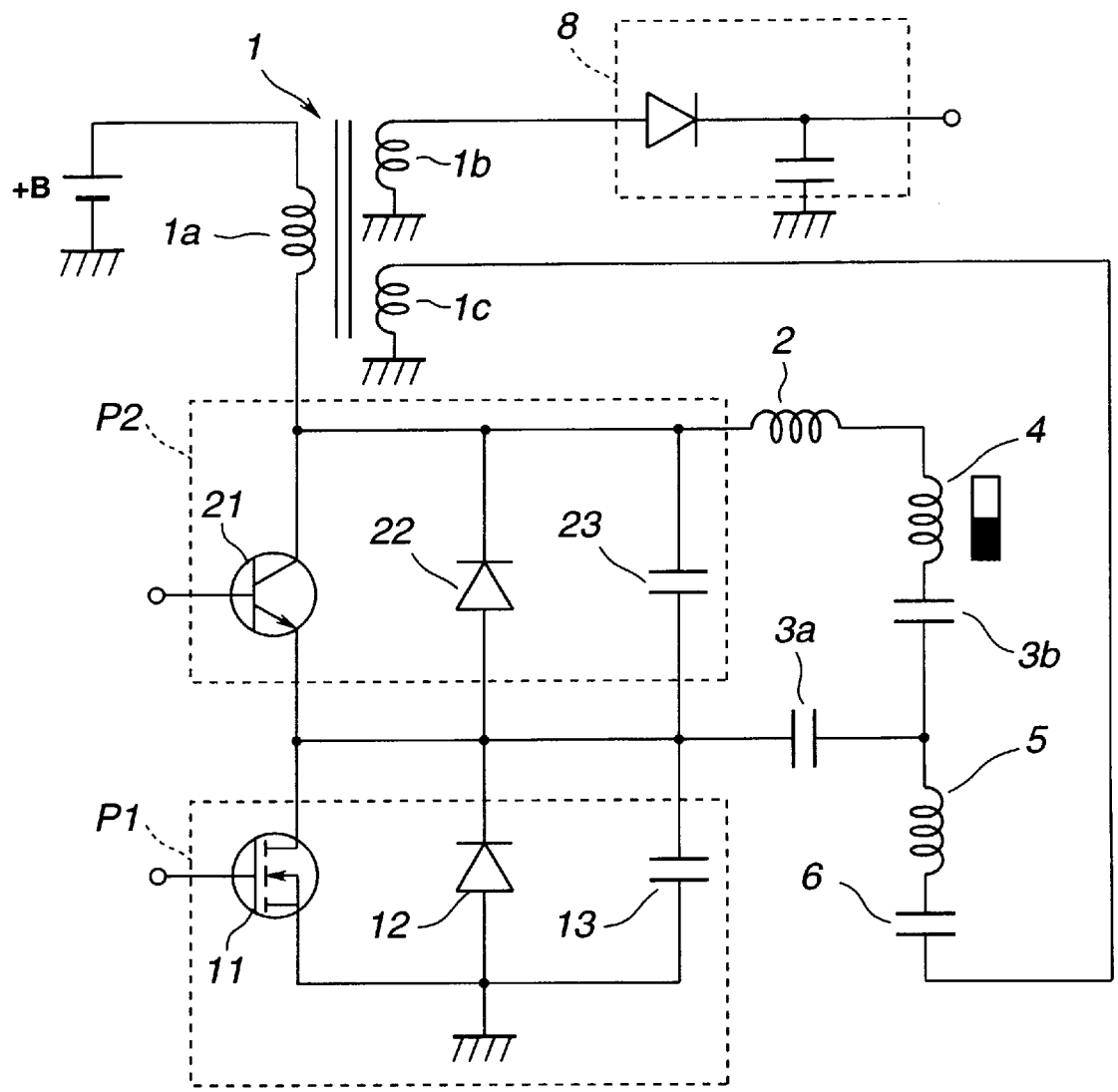
FIG. 7 is a view showing a first modified example of the horizontal deflection circuit.

The first modified example shown in FIG. 7 comprises first parallel circuit P1 having one end grounded and composed of FET 11 serving as first switching element, first damper diode 12 and first resonance capacitor 13, second parallel circuit P2 having one end connected to the other end of the first parallel circuit P1 and composed of transistor 21, second damper diode 22 and second resonance capacitor 23, and flyback transformer 1 in which primary winding 1a is connected between the second parallel circuit P2 and DC power source (supply terminal). The flyback transformer 1 comprises two secondary coils 1b, 1c, wherein a rectifying circuit 8 for generating DC voltage is connected to the secondary coil 1b. Moreover, between one end and the other end of the second parallel circuit P2, there are connected in series a first sigmoid (S-shaped) distortion characteristic correction capacitor 3a, a second sigmoid (S-shaped) distortion characteristic correction capacitor 3b, a horizontal linearlity correction coil 4 and horizontal deflection yoke 2. Further, between junction of the first sigmoid correction capacitor 3a and the second sigmoid correction capacitor 3b and the secondary coil 1c of the flyback transformer 1, there are connected in series a pulse modulation transformer 5 and a capacitor 6.

Figure 8:
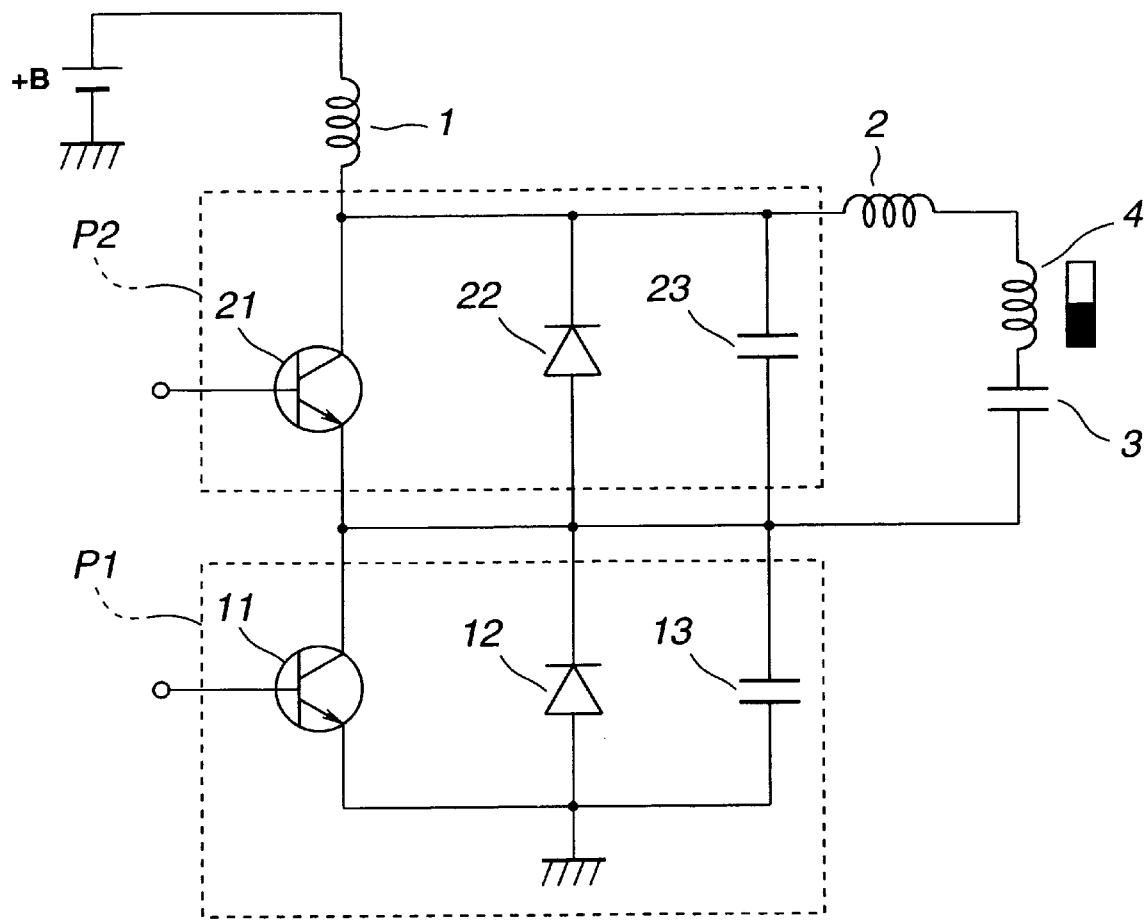
FIG. 8 is a view showing a second modified example of the horizontal deflection circuit.

In addition, the second modified example shown in FIG. 8 comprises first parallel circuit P1 having one end grounded, and composed of first transistor 11, first damper diode 12 and first resonance capacitor 13, second parallel circuit P2 having one end connected to the other end of the first parallel circuit P1, and composed of second transistor 21, second damper diode 22 and second resonance capacitor 23, flyback transformer 1 connected between the second parallel circuit P2 and DC power source (supply terminal), and sigmoid (S-shaped) distortion characteristic correction capacitor 3, horizontal linearity correction coil 4 and horizontal deflection yoke 2 which are connected in series between one end and the other end of the second parallel circuit P2.

As described above, in accordance with this invention, withstand voltage of switching element for horizontal output can be reduced, and, on one hand, retrace pulse voltage applied to the horizontal deflection yoke is caused to be large and deflection current is caused to be small. Thus, power loss of the deflection system can be reduced, and picture size adjustment in horizontal direction and distortion correction can be easily carried out.

Moreover, as compared to the conventional horizontal deflection circuit, by making use of the fact that retrace pulse voltage across the both ends of the horizontal deflection yoke is permitted to be large, horizontal retrace time period can be shorter than that of the prior art. Further, since it is possible to employ circuit configuration in which sigmoid (S-shaped) distortion characteristic correction capacitor connected in series with the horizontal deflection yoke is grounded, part(s) or circuit(s) is or are added between this sigmoid (S-shaped) distortion characteristic capacitor and ground, thus making it possible to easily carry out various deflection system corrections.

Furthermore, in accordance with this invention, such an approach is employed to prepare drive waveform with respect to the first switching element and drive waveform with respect to the second switching element at a timing later than (backward in point of time with respect to) the original drive waveform by the same circuit configuration. Thus, even if OFF timing of any switching element is backward in point of time, control can be made. In addition, also at times except for ordinary operation, horizontal deflection operation can be stably carried out.

What is claimed is:

1. A horizontal deflection circuit comprising: a first parallel circuit in which a first switching element, a first damper diode and a first resonance capacitor are connected in parallel, one end of the first parallel circuit being grounded, the first parallel circuit being operative to generate a first pulse; a second parallel circuit in which a second switching element, a second damper diode and a second resonance capacitor are connected in parallel, one end of the second parallel circuit being connected to the other end of the first parallel circuit, the second parallel circuit being operative to generate a second pulse; a horizontal deflection yoke having one end connected to the other end of the second parallel circuit and the other end connected to one end of a sigmoid (S-shaped) distortion characteristic correction capacitor; and a flyback transformer having one end connected to a DC power source and operative to deliver operation current to the first and second switching elements to synthesize the first pulse from the first parallel circuit and the second pulse from the second parallel circuit to generate a deflection current for driving the horizontal deflection yoke, the horizontal deflection circuit comprising:

an integration circuit for integrating a horizontal drive signal inputted thereto;

a first comparison•latch circuit for comparing a signal from the integration circuit with a first level to latch comparison result;

a second comparison•latch circuit for comparing a signal from the integration circuit with a second level to latch comparison result;

a first drive circuit for driving the first switching element in accordance with an output of the first comparison•latch circuit;

a second drive circuit for driving the second switching element in accordance with an output of the second comparison•latch circuit; and control means for controlling the second level.

2. A horizontal deflection circuit as set forth in claim 1, wherein the other end of the flyback transformer is connected to junction of the other end of the first parallel circuit and one end of the second parallel circuit.

3. A horizontal deflection circuit as set forth in claim 1, wherein the first comparison•latch circuit and the second comparison•latch circuit are caused to be of the same configuration so that a signal of the same waveform is inputted thereto.

4. A horizontal deflection circuit as set forth in claim 1, wherein the control means for controlling the second level adjusts or changes the second level by parabola-shaped voltage for correcting pin-cushion distortion.

5. A horizontal deflection circuit as set forth in claim 1, wherein the first switching element is a switching element for horizontal output, and the second switching element is a switching element for correction of pin-cushion distortion.

* * * * *